United States Patent Office 3,098,000
Patented July 16, 1963

3,098,000
NON-PHYTOCIDAL SPRAY OIL
Robert D. Harrison, Orinda, Calif., assignor to Tidewater Oil Company, Los Angeles, Calif., a corporation of Delaware
No Drawing. Filed Mar. 2, 1961, Ser. No. 92,740
16 Claims. (Cl. 167—27)

This invention relates to an improved spray oil composition and to an improved method for helping to protect oil-sprayed plants from certain phytotoxic tendencies of spray oil. This application is a continuation-in-part of application Serial Number 858,018, filed December 8, 1959, now abandoned.

An important object of the invention is to provide a spray oil that is less toxic to certain plants than are the spray oils currently in use.

An example of the kind of problem which the invention is designed to solve is that of the phytotoxicity of spray oil when used to control sigatoka on banana plants. Sigatoka is said to be a fungus named *Cercospora musae* in its imperfect stage and *Mycosphaerella musicola* in its perfect stage. It has been combatted in a variety of ways but never with complete satisfaction to the banana growers. For several years the approved practice involved the use of large quantities of Bordeaux mixture. This process was so expensive that a considerable portion of the income of the fruit companies was spent on Bordeaux mixture. Recently, it was found that spray oil could be used to control sigatoka at a fraction of the cost of Bordeaux mixture. However, it was later discovered that the spray oil, while giving excellent control of sigatoka, was seriously inhibiting the development of banana plants and markedly reducing their yield. Typically, the total crop yield per plant decreased approximately 10% by weight, and the plants took about 25% longer to mature even into this reduced crop; the net result was an annual crop reduction of nearly 30%.

Accordingly, one object of the invention is to control sigatoka on banana plants with spray oil without producing this marked reduction in plant yield and this disastrous deferral of plant maturity.

A similar problem exists in the citrus industry where spray oil is used to control red spider and other similar pests. Heretofore, it has been necessary to use very light applications of the spray oil; otherwise there was severe leaf drop, fruit drop, dying back of twigs and branches, reduction in the bloom and set of fruit, impairment of the fruit color, and impairment of fruit quality and size. As a result, the pests have often been inadequately controlled, as the lesser of two evils. In fact, the citrus in Central America is badly attacked by fungus, scale and red spider, yet control by spray oil has not been regularly attempted, partly because the concentrations needed to control the pests may be phytotoxic to these plants under the conditions obtaining in Central America.

Hence, another object of the invention is to provide a spray oil that can safely be used on citrus trees in larger quantities than has heretofore been feasible and which will therefore enable better control of the pests attacking these trees.

Other problems of pest control are met with on cacao and coffee plants, which are grown in the shade and tend to burn easily. Coffee plants are attacked by a fungus called *Omphalia flavida*. This fungus can be controlled by proper application of spray oil under ordinary conditions, but on a hot day, the application of spray oil has tended to burn the leaves. Cacao plants are attacked by a fungus called *Phytophthora palmivora*. Spray oil seems to change the environment of this fungus on the cacao pods by preventing moisture from getting to the spores, which will not grow in the absence of a film of moisture. Cacao grows in quick spurts, and the young red leaves are very easily burned. Apparently, peroxides and acids form in conventional spray oil and tend to cause the cacao leaves to burn.

Another object of the present invention is to provide a spray oil that will achieve the desired fungus control on cacao and coffee plants without producing the undesirable burning effects heretofore encountered with the use of proper amounts of spray oil on these plants.

The above problems are exemplary only and do not exhaust the applicability of this invention. Moreover, other objects and advantages of the invention will appear from the following description.

It has been found that modern non-phytocidal spray oil is not substantially harmful to the treated plants if free from oxidation products. As is well known in the art, the term "non-phytocidal spray oil" is used to designate highly treated petroleum oils having a high unsulfonated residue. (Cf. Volck Patents 1,707,465–1,707,470.) Generally, such spray oils have unsulfonated residues in excess of 88% and have viscosities ranging from about 50–120 S.U.S. at 100° F. Oxidation causes or imparts the phytotoxicity, for the oxidized products, including peroxides and acids, attack the plant and are believed to be responsible for the problems noted above. Moreover, it has been found that spray oil oxidizes much more rapidly in the hot, sunny climates where bananas and citrus are grown than in cooler, less sunny climates.

I have found that this harmful oxidation is catalyzed by ultraviolet radiation. Moreover, I have found that this catalytic effect can be counteracted by incorporating into the spray oil a small amount of a spray-oil-soluble chemical that absorbs or screens out ultraviolet light. It is known that ultraviolet radiation has practically no effect on plant growth, so that shielding the plant from these ultraviolet rays does not inhibit the plant growth, but it does inhibit the oxidation of the spray oil.

While oxidation can be inhibited directly by antioxidants, and many of these are safe to use on plants, antioxidants prevent oxidation by themselves chemically combining with the oxygen, and, once combined, they are exhausted, and are no further protection against the formation of phytocidal oxidation products in spray oil. By themselves, therefore, antioxidants only defer the phytocidal effects.

However, I have found that when the antioxidants are incorporated in spray oil containing ultraviolet-absorbing chemicals, the antioxidants are exhausted much less rapidly, and the spray oil is therefore protected not only from ultraviolet radiation but also from oxidation itself over a much longer period of time.

This invention contrasts with attempts to prolong the activities of fungicides by preventing their deterioration. In the present instance the fungicidal activity of the spray oil is not affected by the incorporation of the ultraviolet screening material; the trouble with spray oils has not been lack of activity but the harm done to the plant. The present invention, therefore, uses the ultraviolet screening ingredients, with or without antioxidants, to lessen the phytocidal tendency of spray oil without affecting its pesticidal tendencies.

The ultraviolet screening materials suitable for use in this invention are nontoxic to the plants involved and are soluble in spray oil. The ultraviolet screening material need have no fungicidal or insecticidal properties.

Examples of suitable ultraviolet screening materials include 2-hydroxy-4-methoxybenzophenone (sold by American Cyanamid Company under the name of UV Absorber 9 or UV–9, and sold by Antara Chemicals under the name of Uvinol M–40), methyl anthranilate (sold as Sunscreen 2 by Givaudan Delawahn, Inc.), benzotriazole and its derivatives (sold as Tinuvin by the Geigy Company), 2,2'-dihydroxy 4,4' dimethoxybenzophenone (sold by Antara Chemicals as Uvinol 49 and, in a mixture with other substituted benzophenones, as Uvinol 490), and 2,2',4,4' tetrahydroxybenzophenone (sold by Antara Chemicals as Uvinol D-50).

To illustrate the reduction in spray-oil oxidation obtained by incorporation of ultraviolet-absorbing materials, a test was made using a light commercial spray oil, having a Saybolt Universal viscosity of approximately 65 seconds at 100° F. and an unsulfonated residue of 94%. The oil was California petroleum distillate that was solvent-treated with sulfur dioxide, then treated with concentrated sulfuric acid, neutralized, washed, and dried. Two samples were placed in a pan to provide a layer about 1/16" thick and exposed to sunlight for three days. One sample was untreated; the other contained 0.56 cc. of methyl anthranilate in 470 cc. of the spray oil. After the three days' exposure, neutralization numbers were obtained by ASTM method D-974-55T. (Throughout this application the neutralization numbers mentioned were obtained by this particular test.) The control (which initially had a neutralization number of zero) was found to have a neutralization number of 0.36, while that containing the ultraviolet-shielding material had a neutralization number of only 0.13, showing that approximately one-third as much oxidation had taken place.

Further tests were run simultaneously under slightly different weather conditions over a four-day period, using smaller quantities of ultraviolet-absorbing material and, in some instances, some Du Pont 22 antioxidant (Du Pont 22, I am informed, is chemically, NN'-di-sec-butyl-para-phenylenediamine). The results of these tests, all of which started using an oil substantially the same as that used in the first experiment and having initially a neutralization number of zero, appear in the following table:

*Table I*

| Sample | Neutralization number |
|---|---|
| (1) Untreated spray oil (control) | 0.50 |
| (2) Spray oil, 400 cc.; UV-9, 0.021 grams; Sunscreen 2, 0.021 cc. | 0.39 |
| (3) Same as sample 2 plus 0.01 cc. Du Pont 22 | 0.45 |
| (4) Spray oil, 400 cc.; UV-9, 0.042 grams; Sunscreen 2, 0.042 cc.; Du Pont 22, 0.01 cc. | 0.33 |

The conclusion can be drawn from the above table that small quantities of ultraviolet absorbers do not inhimit the ultraviolet light as well as do somewhat larger quantities. Accordingly, another test was run using larger quantities of these ingredients. Again, these tests were run simultaneously over a period of four days in the sunlight with the material placed in pans in a layer approximately 1/16" thick so as to expose a thin layer of considerable area to the ultraviolet activity.

*Table II*

| Sample | Neutralization number |
|---|---|
| (5) Control spray oil (as before) | 0.22 |
| (6) Spray oil, UV-9, 400 cc.; 0.4 grams | 0.08 |
| (7) Spray oil, 400 cc.; Sunscreen 2, 0.5 cc. | 0.08 |
| (8) Spray oil, 400 cc.; UV-9, 0.4 grams; Du Pont 22, 0.2 cc. | 0.0 |
| (9) Spray oil, 400 cc.; Sunscreen 2, 0.5 cc.; Du Pont 22, 0.2 cc. | 0.0 |

Table II indicates that what is still a very small amount of ultraviolet screen material per the amount of spray oil can reduce oxidation of the spray oil to the vanishing point, at least within the four-day test period.

Further tests were run with a 70 pale oil having an A.P.I. gravity of 27.6, a viscosity of 72.6 S.S.U. at 100° F., an unslfonated residue of 88.4, and a neutralization number, before the tests, of 0.03.

For Table III, some samples were run by exposing the oil to a powerful ultraviolet lamp for nine hours, and others were left under the same lamp for twelve hours. Both peroxide and neutralization numbers were run, and the results show the marked effect achieved by the invention.

*Table III*

| Sample | Nine hours ultraviolet light | | Twelve hours ultraviolet light | |
|---|---|---|---|---|
| | Neutralization number | Peroxide number | Neutralization number | Peroxide number |
| (10) Control spray oil (#70 pale oil) | 0.57 | 5.7 | 1.65 | 10.3 |
| (11) #70 pale oil, 99.95 cc.; Du Pont 22, .05 cc. | 0.29 | 7.6 | 1.17 | 12.7 |
| (12) #70 pale oil, 100. cc.; UV-9, 0.4 gms. | 0.24 | 5.8 | 0.60 | 7.3 |
| (13) #70 pale oil, 100. cc.; Tinuvin P, 0.4 gms. | 0.25 | 4.9 | 0.40 | 7.1 |
| (14) #70 pale oil, 100. cc.; Antara D-49, 0.4 gms. | 0.29 | 4.4 | 0.40 | 7.0 |
| (15) #70 pale oil, 99.95 cc.; Du Pont 22, 0.05 cc.; UV-9, 0.4 gms. | 0.19 | 4.7 | 0.30 | 9.6 |

The preferable range, considering estimated cost as well as activity, is for the ultraviolet shielding agent to be in a ratio to the spray oil of between 1 to 250 parts and 1 to 2,000 parts. The range, of course, depends somewhat upon the materials used, and other materials with more intense or less intense activity would preferably be used in somewhat different proportions, adjustments being made, as the man skilled in the art would know.

When oxidation inhibitors are used in approximately 1 to 500 to 1 to 2,000 range, the invention is particularly effective, not only because of the protective activity of the ultraviolet screening material upon the spray oil but also because of a like effect on the oxidation-inhibiting material. Thus, the antioxidant has a much longer effective life than where no ultraviolet screening material is used. The longer the test runs, the longer these effects would be noted because when the ultraviolet screen material is combined with the oxidation inhibitor, oxidation is delayed in two ways, both by the direct prevention of the catalytic action of ultraviolet light on the oxidation of the spray oil and by the preservation of the inhibitive qualities of the oxidation inhibitor.

In addition to Du Pont 22, other oxidation inhibitors may also be used, such as hydroquinone, other phenylenediamines, di-tert-butylphenol, and various paraamino phenols. Other non-phytotoxic, soluble-in-spray-oil oxidation inhibitors, known in the art, may be used.

Preferably, both the antioxidant and the ultraviolet screen material are water insoluble, so that they will not be washed out by rains or overhead irrigation.

A spray oil containing an ultraviolet shield with or without an oxidation inhibitor is made up in the normal manner and sprayed by the normal spraying techniques, with the exception that it becomes possible to use increased amounts of spray oil, when that is desirable. When used in this manner, the desired fungicidal and insecticidal activity is obtained but without undue inhibition of the plant growth and crop development.

I claim:

1. A plant-parasiticidal petroleum spray oil of at least 88% unsulfonated residue and a viscosity lying in the range of 50 to 120 S.U.S. at 100° F., containing dissolved non-phytotoxic ultraviolet-light absorbing chemical in a quantity sufficient to substantially decrease the tendency of the oil to become phytocidal upon exposure to sunlight.

2. A horticultural pesticidal composition comprising an originally non-phytocidal petroleum spray oil of at least 88% unsulfonated residue and a viscosity lying in the range of 50 to 120 S.U.S. at 100° F., containing between one part in two hundred fifty and one part in two thousand of an oil-soluble, non-phytotoxic ultraviolet-light absorbing agent to inhibit the development of phytotoxicity upon exposure to sunlight.

3. The composition of claim 2 wherein the ultraviolet light absorbing agent is 2-hydroxy-4-methoxybenzophenone.

4. The composition of claim 2 wherein the ultraviolet-light absorbing agent consists essentially of 2,2'-dihydroxy-4,4'-dimethoxybenzophenone.

5. The composition of claim 2 wherein the ultraviolet-light absorbing agent is 2,2',4,4'-tetrahydroxybenzophenone.

6. The composition of claim 2 wherein the ultraviolet-light absorbing agent is menthyl anthranilate.

7. The composition of claim 2 wherein the ultraviolet-light absorbing agent is benzotriazole.

8. An improved horticultural non-phytocidal petroleum spray oil having an unsulfonated residue of at least 88%, having a viscosity of between 50 and 120 S.U.S. at 100° F., and having a reduced tendency to develop phytotoxicity on exposure to sunlight by virtue of its containing an effective amount of oil-soluble non-phytotoxic antioxidant and an effective amount of oil-soluble non-phytotoxic ultraviolet-shielding chemical.

9. A composition consisting essentially of initially non-phytocidal horticultural petroleum spray oil having an unsulfonated residue of at least 88% and a viscosity of between 50 and 120 S.U.S. at 100° F., containing in solution between 1 to 250 and 1 to 2,000 parts of water-insoluble non-phytotoxic ultraviolet light absorbing agent and a similar amount of water-insoluble non-phytotoxic antioxidant, thereby inhibiting the development of phytotoxicity in the spray oil upon exposure to sunlight due to oxidation catalyzed by ultraviolet light.

10. The composition of claim 9 wherein the antioxidant is NN'-di-sec-butyl-paraphenylene diamine.

11. A process for ridding plants of pests without undue inhibition of plant growth and development, comprising spraying the plant with non-phytocidal petroleum spray oil of at least 88% unsulfonated residue and a viscosity in the range of 50 to 120 S.U.S. at 100° F., in which is dissolved an effective amount of ultraviolet-light absorbing non-phytotoxic chemical.

12. A process for treating sigatoka-infested banana plants, comprising spraying them with non-phytocidal petroleum spray oil of at least 88% unsulfonated residue and a viscosity in the range of 50 to 120 S.U.S. at 100° F., containing in solution effective amounts of a non-phytotoxic ultraviolet-light absorbent.

13. A process for protecting citrus from red spider and the like, comprising spraying the citrus trees with non-phytocidal petroleum spray oil having an unsulfonated residue of at least 88% and a viscosity lying in the range of 50 to 120 S.U.S. at 100° F., and containing in solution a non-phytotoxic ultraviolet light-absorbing chemical.

14. A process for ridding plants of pests without undue inhibition of plant growth and development comprising spraying the plant with non-phytocidal petroleum spray oil of at least 88% unsulfonated residue and a viscosity lying in the range of 50 to 120 S.U.S. at 100° F., in which is dissolved an effective amount of an oil-soluble, water-insoluble ultraviolet light absorbing non-phytotoxic chemical and an effective amount of oil-soluble, water-insoluble non-phytotoxic antioxidant.

15. A process for treating sigatoka-infested banana plants, comprising spraying them with non-phytocidal petroleum spray oil of at least 88% unsulfonated residue and a viscosity lying in the range of 50 to 120 S.U.S. at 100° F., containing in solution effective amounts of a non-phytotoxic oil-soluble, water-insoluble ultraviolet light absorbent and a non-phytotoxic oil-soluble water-insoluble antioxidant.

16. A process for protecting citrus from red spider and the like, comprising spraying the citrus trees with non-phytocidal petroleum spray oil having an unsulfonated residue of at least 88% and a viscosity of 50 to 120 S.U.S. at 100° F., containing in solution an effective amount of a non-phytotoxic oil-soluble, water-insoluble ultraviolet light absorbing chemical and a non-phytotoxic effective amount of an oil-soluble, water-insoluble antioxidant.

References Cited in the file of this patent

UNITED STATES PATENTS

| | | |
|---|---|---|
| 2,170,185 | Carpenter | Aug. 22, 1939 |
| 2,240,806 | Sharp | May 6, 1941 |
| 2,274,725 | Meeker | Mar. 3, 1942 |
| 2,465,335 | Burkhard | Mar. 29, 1949 |
| 2,498,630 | Thompson | Feb. 28, 1950 |
| 2,686,812 | Wynn | Aug. 17, 1954 |
| 2,693,492 | Hock | Nov. 2, 1954 |

OTHER REFERENCES

Frear: Chemistry of Insecticides, Fungicides, and Herbicides, 2nd Ed., 1948, pp. 194–195.